UNITED STATES PATENT OFFICE.

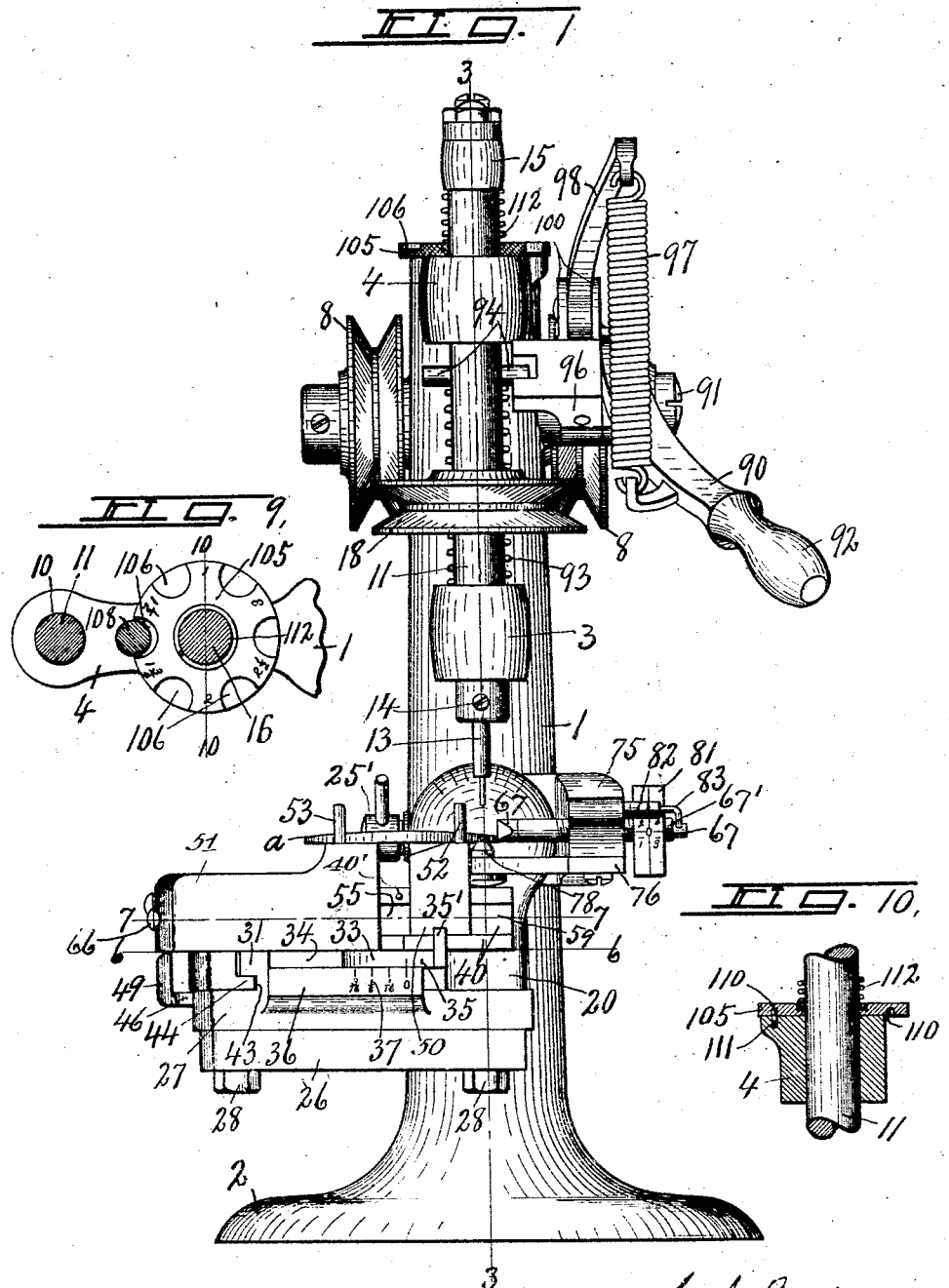

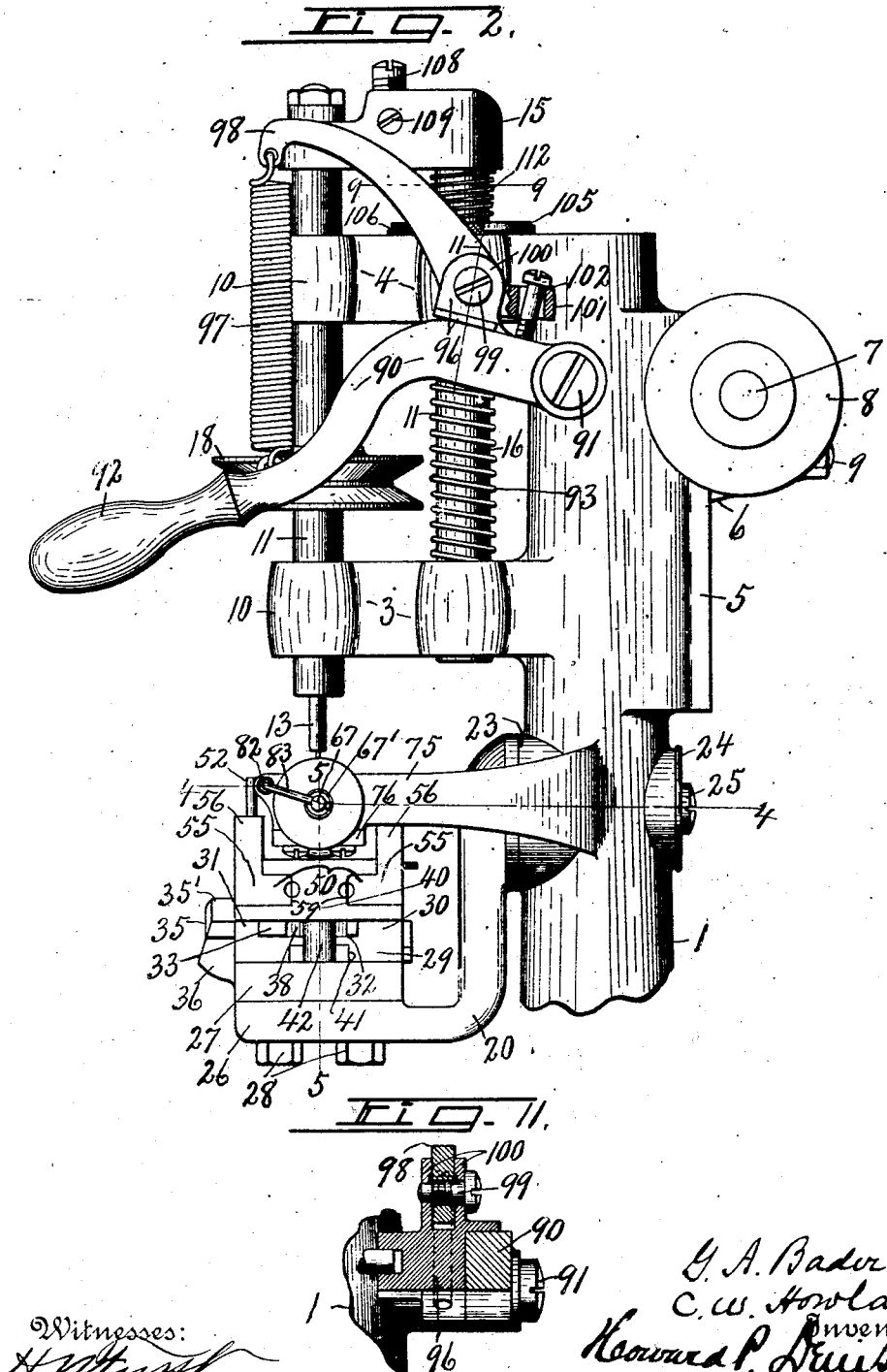

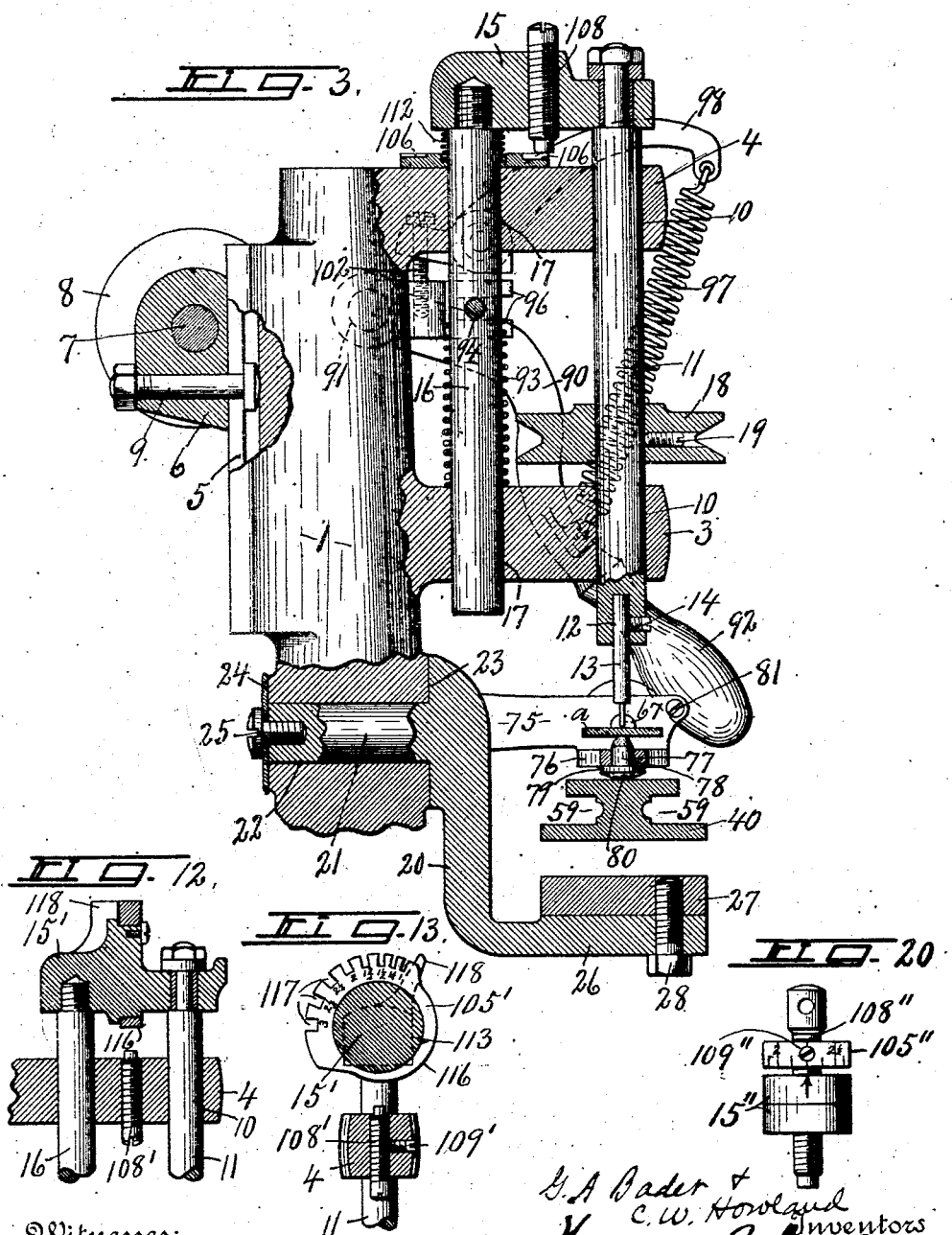

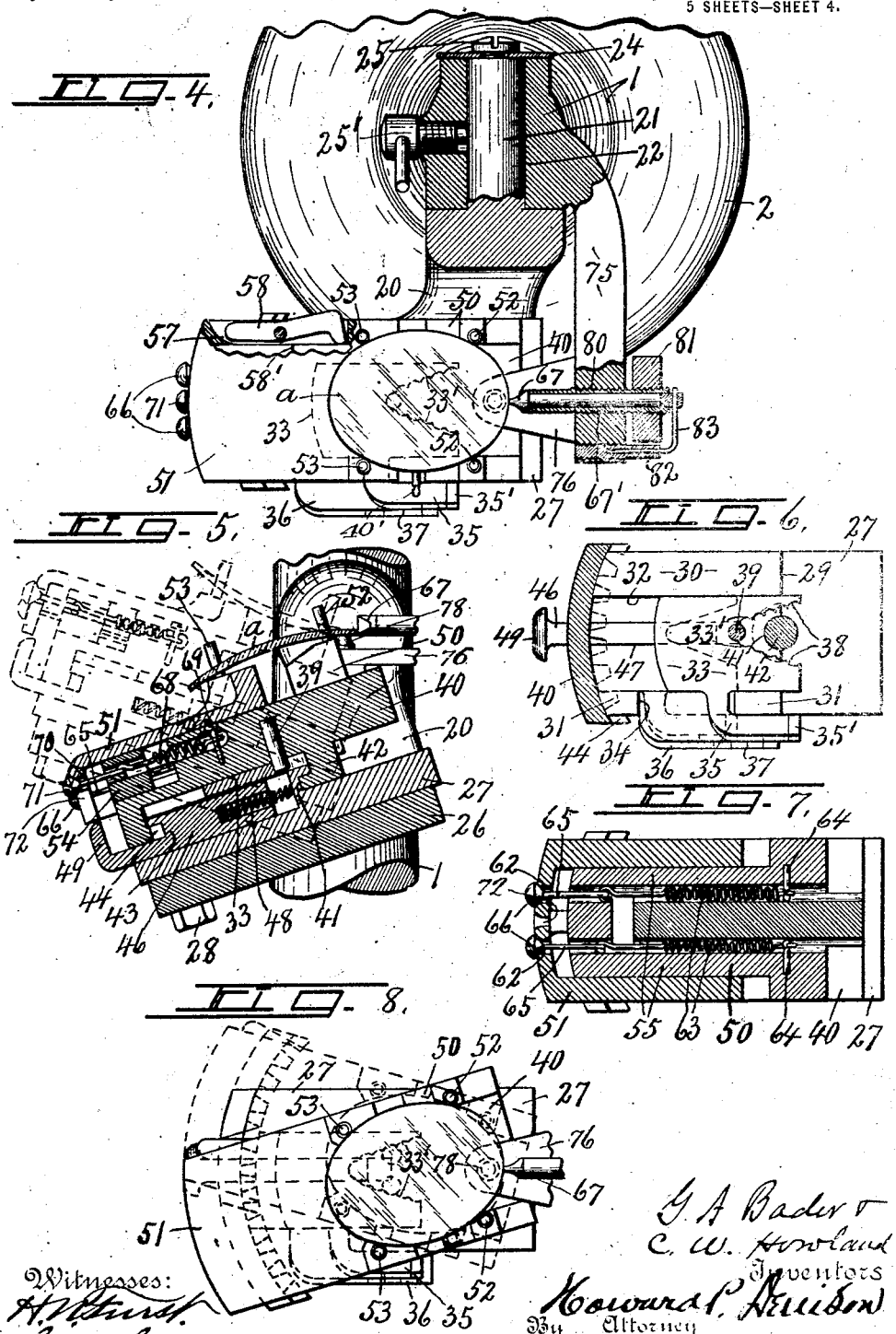

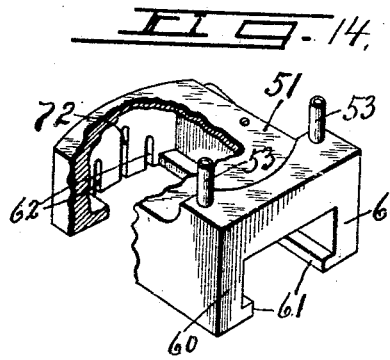
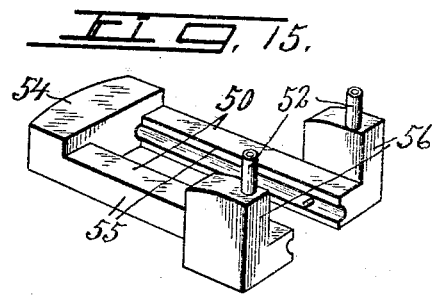
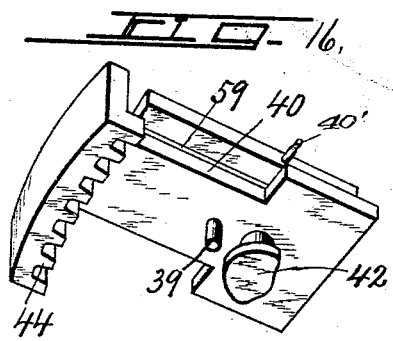
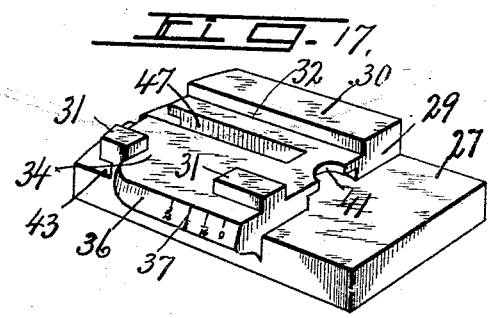
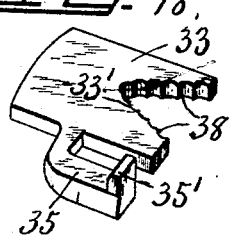
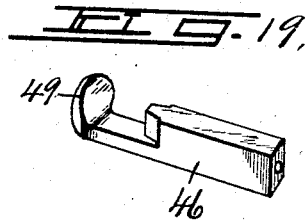

GUSTAV A. BADER, OF ROCHESTER, AND CHAUNCEY W. HOWLAND, OF GENEVA, NEW YORK, ASSIGNORS TO THE STANDARD OPTICAL COMPANY, OF GENEVA, NEW YORK, A CORPORATION OF NEW YORK.

LENS-DRILLING MACHINE.

1,141,859.   Specification of Letters Patent.   Patented June 1, 1915.

Application filed September 12, 1912. Serial No. 719,950.

*To all whom it may concern:*

Be it known that we, GUSTAV A. BADER and CHAUNCEY W. HOWLAND, of Rochester and Geneva, respectively, in the counties of Monroe and Ontario, respectively, in the State of New York, have invented new and useful Improvements in Lens-Drilling Machines, of which the following, taken in connection with the accompanying drawings, is a full, clear, and exact description.

This invention relates to certain improvements in lens drilling machines of the class set forth in the patent to C. W. Howland, #979,007, December 20, 1910, in so far as it relates broadly to a lens support which is adjustable horizontally and vertically to different angles relatively to the axis of a rotary and axially movable drill spindle and to adjustable stops for gaging the depth of the drill hole and its distance from the edge of the lens.

In drilling lenses for the reception of mountings and for other purposes, it is customary to drill part way through the lens from one side and then to reverse the lens and drill from the opposite side until the drill point reaches the apex of the previously drilled hole, thus forming an aperture which is shaped somewhat like an hour-glass or contracted at the meeting ends of the two drill holes after which the contracted portion is reamed and finished to the desired size by means of a reamer and frequently results in breaking away the adjacent portions of the lens between the hole and rim. Furthermore it sometimes happens through careless manipulation that the drill will be forced into the lens under excess pressure sufficient to cause the lens to break or if a diamond drill is used to cause the breaking or chipping of the drill.

The main object, therefore, of our present invention is to provide a lens drilling machine by which the holes for the mountings may be easily and quickly drilled from opposite sides of the lens with perfect accuracy to finish the hole with the drill without the additional operation of reaming and without liability of breaking either the lens or drill even in the hands of unskilled or careless operators.

Another object is to enable the lens holder with the lens thereon to be adjusted horizontally so as to bring the mechanical axis of the lens to the same angle at either side of its neutral position by a single gage setting of the lens holder so that when the lens support is set to drill a lens part-way through from one side a predetermined distance off-center, such lens may be reversed in the holder and the latter adjusted angularly in the opposite direction until automatically stopped and then redrilled from the opposite side with the assurance that the two drill holes from opposite sides will be in exact alinement.

Another object is to provide the machine with a multiple stop gage coöperating with one of the movable operating parts for reciprocating the drill, whereby lenses of different thicknesses may be drilled the proper distance through from one side by simply adjusting the stop gage so as to bring its particular stop corresponding to the gage of the lens into registration with the coöperative stop on the reciprocating drill supporting frame.

Another object is to obviate as far as possible the use of screws and similar fastening means in assembling the various parts of the lens support and its coöperating adjuncts.

Other objects and uses relating to specific parts of the machine will be brought out in the following description.

In the drawings:—Figure 1 is a front elevation of a lens drilling machine embodying the various features of our invention. Fig. 2 is a side elevation of the mechanism shown in Fig. 1, except that the lower portion of the standard is broken away. Fig. 3 is a transverse vertical sectional view, partly in elevation, of the upper portion of the machine taken on line 3—3, Fig. 1. Fig. 4 is a horizontal sectional view taken on line 4—4, Fig. 2. Fig. 5 is a vertical sectional view of the lens support taken on line 5—5, Fig. 2. Figs. 6 and 7 are horizontal sectional views of portions of the mechanism shown in Fig. 5, taken respectively on lines 6—6 and 7—7, Fig. 1. Fig. 8 is a top plan of a horizontally adjustable portion of the lens support in position for drilling the lens off-center from one side, the dotted lines indicating the position of adjustment for completing the drill hole from the opposite side. Fig. 9 is a horizontal sectional view of the upper portion of the drill supporting frame taken on line 9—9, Fig. 2, showing the preferred form of stop gage in top plan. Fig. 10 is a detail vertical sectional view taken on line 10—10, Fig. 9. Fig. 11 is a detail sectional view through a portion of the operating lever for the drill spindle taken on line 11—11, Fig. 2. Fig. 12 is a vertical sectional view of the upper portion of the supporting frame for the drill spindle and its guide showing a modified form of depth gage for the drill. Fig. 13 is a face view of the gage shown in Fig. 12, showing a part of the machine upon which it is mounted in section. Figs. 14 and 15 are perspective views of the detached lens clamping plates, a portion of Fig. 14 being broken away to show the vertical slots in the end thereof. Fig. 16 is a perspective view of the detached lens centering and decentering block. Fig. 17 is a perspective view of the detached base block for receiving and supporting the block shown in Fig. 16. Fig. 18 is a perspective view of the detached gage plate for regulating the centering and decentering of the lens. Fig. 19 is a perspective view of the detached locking plate for the lens centering and decentering block, shown in Fig. 16, and Fig. 20 is a face view of a modified depth gage.

This drilling machine comprises an upright standard —1— preferably of cast metal having an integral supporting base —2— and integral forwardly projecting arms or brackets —3— and —4— spaced some distance apart one above the other near the upper end thereof, the rear side of the upper portion of the standard being provided with vertical ways —5— upon which is mounted a vertically movable bracket —6— carrying a horizontal shaft —7— upon which is mounted a pair of idler sheaves —8— for receiving a driving belt (not shown), said bracket being clamped in its adjusted position by one or more bolts —9—, as shown more clearly in Fig. 3.

The forward ends of the arms —3— and —4— are provided with vertically alined journal bearings —10— for receiving a vertically disposed revoluble drill spindle —11— having its lower end provided with a socket —12— in which a drill —13— is secured by means of a set screw —14—, the upper end of said drill spindle being journaled in a yoke —15— which is disposed some distance above the upper arm or bracket —4— and is secured to the upper end of a vertical guide rod —16—. This guide rod is slidable endwise in vertically alined guide openings or ways —17— and extends a short distance below the lower arm —3— and together with the yoke —15— constitutes what may be termed the supporting frame for the drill spindle for moving the latter axially.

A pulley —18— is secured by a set screw —19— to the intermediate portion of the drill spindle —11— between the arms or brackets —3— and —4— and is adapted to be driven by the belt previously mentioned which passes around the sheaves —8— and is adapted to be connected to any available source of power, not necessary to herein illustrate or describe.

*Work holder.*—Suitable means is provided for supporting the lens in a horizontal plane or at right angles to the axis of the drill spindle and also for supporting it at an angle above or below such horizontal position or at different angles relatively to the axis of the drill spindle according to the contour of the lens; (that is, whether plain or toric), and also for adjusting the lens horizontally to different angles so as to drill the same in the major axis or at either side thereof. This lens holding means, forming the subject matter of a divisional application No. 757,326, filed March 28, 1913, comprises a bracket —20— having a rearwardly projecting spindle —21— journaled in a suitable bearing —22— in the intermediate portion of the standard —1— so as to enable the bracket to be adjusted rotarily or tilted vertically to different angles. The front end of the spindle —21— at its junction with the bracket —22— is enlarged to form an annular shoulder —23— abutting against the adjacent face of the standard and is preferably graduated to indicate the degree of angular adjustment, the rear end of the spindle being provided with a removable shoulder or washer —24— and clamping screw —25'— which together with the shoulder —23— holds the spindle and bracket in operative position against axial movement. The journal bearing for the bracket —20— is located a sufficient distance to the rear of the drill spindle to afford ample clearance for the manipulation of the lens as —a— in the lens clamp hereinafter described, the axis of movement of the bracket —20— being disposed in the same vertical plane from front to rear as that of the drill spindle and also in approximately the same horizontal plane as the lens rest presently described, said bracket being held in its adjusted position by a set screw —25'— Fig. 4. The object of this vertical angular adjustment of the supporting bracket —20— of the lens holder is to enable the portion of the lens which is to be drilled to be brought into a horizontal plane at right angles to the axis of the drill spindle either in the major axis or at either side thereof.

The bracket —20— extends downwardly from its supporting spindle —21— and is provided with a forwardly projecting horizontal offset —26— underlying the drill spindle transversely of the axis thereof for receiving and supporting a base block —27— forming a part of the lens holder and screwed to the upper face of the offset —26— of the bracket —20— by suitable fastening means as screws —28—. The base block —27— and its supporting arm —26— extend laterally a greater distance to one side (preferably the left-hand side) of the axis of the drill spindle than to the other side so as to afford ample support for the adjustable lens clamps in drilling the lens close to the right hand edge thereof, said base block being provided with a raised portion —29— having lengthwise ribs —30— and —31— near the edges thereof but spaced some distance apart to form an intervening relatively shallow recess —32— for receiving and guiding a horizontally adjustable drill centering and de-centering gage plate —33— shown more clearly in Fig. 6, the intermediate portion of the rib —31— being cut away to form a recess —34— in which the operating arm as —35— of the centering and de-centering plate is movable.

The front side of the raised portion —29— of the base block —27— is provided with a laterally projecting lengthwise rib —36— having graduations —37— coacting with an index on the operating arm —35— of the gage plate —33— to indicate the point at which the lens is to be drilled relatively to the major axis of such lens. For this purpose, the right-hand end of the gage plate —33— is provided with a V-shape slot —38— for receiving a stud or stop pin —39— in a superposed laterally swinging drill centering block —40— which is detachably mounted on the upper side of the base block —27— to swing horizontally or laterally about an axis some distance to one side (in this instance left-hand side) of the axis of the drill spindle, as shown more clearly in Fig. 5. The base block —27— and laterally swinging block —40— are preferably made of die castings and adapted to be detachably connected without the use of screws, rivets or bolts, and for this purpose the right-hand end of the raised portion —29— is provided with a central semi-circular journal bearing —41— some distance to the left-hand side of the axis of the drill spindle and having its lower end enlarged or undercut for interlocking engagement with a journal stud —42— projecting downwardly from the underside of the centering block —40—, the lower end of the stud —42— having an enlarged semi-circular flange fitting in the enlarged portion of the journal bearing —41— so as to hold the centering block —40— on the base block —27— against upward displacement when in operative position. The opposite or left-hand end of the base block —27— is provided with a horizontally extending transverse groove —43— concentric with the axis of the journal bearing —41— for receiving a toothed rack —44— on the adjacent end of the centering block —40—, said rack being also concentric with the axis of the journal bearing —41—. The left-hand end of the raised portion —29— of the base block —27— and corresponding end of the centering block —40— are also concentric with the axis of the journal bearing —41—, said end of the centering block —40— being extended under and downwardly across the corresponding end of the raised portion —29— and preferably extends from side to side thereof. The groove —43— in which the rack —44— is movable is open at both ends so as to allow the centering block —40— to be rocked laterally about the axis of the bearing —41— so as to disengage the centering block from the base block —27— when the gage plate —33— is moved to the left out of the path of the stop pin —39—.

A locking bolt —46— is slidably mounted in a lengthwise recess —47— in the raised portion —29— of the base block —27— and is normally spring pressed into engagement with the teeth of the rack —44— by a spring —48— and may be forced inwardly against the action of the spring by means of an external hand-piece or knob —49—, as shown in Figs. 5 and 6. This locking member —46— is fitted with an easy sliding fit in the slot —47— between the base of said slot and underside of the gage plate —33— with sufficient clearance to prevent the shifting of the gage block when the locking bolt is operated. In like manner the gage block —33— is mounted with an easy sliding fit between the upper face of the base block —27— and lower face of the centering block —40— and its operating arm —35— is offset longitudinally and provided with a finger piece —35'— by which the gage block may be moved along the graduations —37— relatively to the stop pin —39—.

The portions of the gage block —33— at opposite sides of the V-shape slot —38— constitute stop faces converging from the inner end toward the opposite end of the plate, the point of convergence also forming a limiting stop fitting closely against the pin —39— for locking the centering block —40— so as to drill the lens on the center or major axis and when the gage plate —33— is in this position, its index registers with the zero graduation —37—. These inclined stop faces are disposed at the same angle with and at opposite sides of a plane drawn through the axes of the bearing —41— and drill spindle when the centering block is in its normal position for drilling in the major axis of the lens and have stepped bearings —33'—.

By shifting the gage block to the left a predetermined distance indicated by the graduations —37— and withdrawing the locking bolt —46—, the centering block —40— with the lens thereon may be rocked laterally about its axis until limited by the stop pin —39— engaging one of the stepped bearings of the gage plate, thereby bringing the lens into position to drill part way through it such predetermined distance to one side of its center or major axis, and with the same setting of the gage plate, the lens may be inverted on the holder and the centering block —40— rocked in the opposite direction until again limited by the stop pin —39—, thereby bringing the previously drilled part of the holder in exact alinement with the drill ready to finish the drilling of the holder through the lens. In like manner the gage plate —33— may be adjusted for drilling the lens at any predetermined distance indicated by the graduations —37— at either side of the center or major axis with the assurance that the drill holes from opposite sides of the lens will always be in exact alinement with a single setting of the gage plate.

Suitable lens clamping plates —50— and —51— are slidably mounted upon the upper face of the centering block —40— and each is provided with a pair of roller studs —52— and —53— for properly centering the lens with its major axis in a medial line between the pins of each pair. These clamping plates —50— and —51— are slidably interlocked with the block —40— so as to be easily and quickly removed when desired, and for this purpose the clamping plate —50— is provided with a head —54— and longitudinally extending arms —55— spaced some distance apart and terminating in upstanding flanges —56— upon which the lens clamping studs —52— are mounted, the arms —55— being adapted to slide in lengthwise grooves —59— in opposite sides of the centering block —40—. The outward sliding movement of the lens-clamping member —50— is limited by a stop pin —40′—. The other lens clamping plate —51— is slidably mounted upon the upper face of the centering block —40— and is provided with opposite longitudinal flanges —60— extending downwardly at the sides of the block —40— and arms —55— of the clamping plate —50—, said flanges —60— being provided with inwardly projecting lengthwise ribs —61— underlying the opposite longitudinal arms —55— along which they are movable.

The lens clamping studs —53— are mounted directly upon the inner end of the plate —51—, the opposite end of said plate extending downwardly across the outer end face of the head —54— of the clamping plate —50— and is provided with a pair of slots —62— spaced equi-distant apart from the center of the plate for receiving suitable attaching members for a pair of springs —63— shown more clearly in Fig. 7. These springs serve to connect the lens clamping plates —50— and —51— and are preferably arranged in lengthwise grooves in the adjacent faces of the clamping member —50— and block —40—, the inner ends of the springs being attached to pins —64— on the clamping plate —50—, while the outer ends of the springs are attached to suitable rods —65— which enter the slots —62— and are provided with heads —66— engaging the outer end face of the lens clamping member —51— so that the springs normally tend to draw the clamping members —50— and —51— toward each other to hold their studs —52— and —53— in engagement with the perimeter of the lens as —a—, Fig. 5. These studs are not only free to roll upon their supporting pins to reduce friction but are preferably removable to permit them to be replaced by new ones when worn. These springs —63— are located in registering lengthwise grooves in the inner faces of the arms —55— and adjacent faces of the block —40— equi-distant from and at opposite sides of the longitudinal center of said block so as to move the lens clamping members in exact parallelism with said longitudinal center and therefore parallel with the major axis of the lens to more accurately center the lens on the support, the outer ends of the springs —63— and attaching rod —65— being passed through registering apertures in the adjacent ends of the clamping plates —50— and —51—. These clamping plates are drawn under yielding pressure toward an edge limiting stop —67— by means of a spring —68— to hold the edge of the lens —a— against said stop during the drilling operation. The spring —68— is centrally disposed within registering openings in the block —40— and outer ends of the clamping members —50— and —51— and has its inner end attached to a suitable fastening member 69— and its outer end connected to an attaching member —70— similar to the attaching member —66— in that its outer end is provided with a head —71— engaged with the outer end face of the clamping member —51—. The attaching member —70— is also seated in a slot —72— in the outer end of the clamping member —51— and opens from the bottom thereof. These open-sided slots for receiving the attaching members —66— and —71— permit the clamping plate —51— to be removed without disengaging the springs —63— and —68— from their respective fastening members —64— and —69—.

The upper faces of the lens clamping members —50— and —51— adjacent the posts —52— and —53— are disposed in the same plane parallel with the outer face of the block —40— and guides along which said clamping members are adapted to move.

When inserting a lens between the clamping pins —52— and —53—, the clamping plates —50— and —51— are drawn apart by hand against the action of the springs —63— a sufficient distance to allow the lens to enter between the pins and when the clamping members are released, said springs automatically draw the clamping members toward each other to cause the pins —52— and —53— to engage the perimeter of the lens and hold it in operative position upon the clamping plates.

The springs —63— and —68— are comparatively light and under light tension just sufficient to draw the lens clamps toward each other with sufficient positiveness to center and hold the lens and to carry said lens into engagement with the stop pin —67—, but it is desirable to provide some means for temporarily holding the lens clamps some distance to the left of the drill spindle during the placing of the lens between the clamping pins, and for this purpose we have provided the rear side of the clamping member —51— with a slot —57— in which is pivotally mounted a holding pawl or detent —58— adapted to engage the adjacent end face of the lens centering and decentering block —40—. This detent is shown more clearly in Fig. 4 and consists of a lever centrally pivoted to the adjacent side of the lens clamping plate —51— with opposite ends thereof disposed at an angle to each other so that when in its unlocked position, the locking end will project beyond the back face of the clamping plate —51— to be engaged by the fingers to press it to its locking position when the lens clamps are drawn back, and when in its locked position, the opposite end projects beyond the back face of the clamp —51— to be engaged by the fingers for unlocking, the lower end of the pawl being adapted to engage a shoulder —58'— on the left-hand end of the block —40—.

The standard —1— is provided with a forwardly projecting integral arm —75— some distance below the lower arm —3— for supporting the edge stop —67— and a plate —76— which is secured to the underside of the arm —75— and extends laterally across the axis of and under the drill —13— and is provided with an aperture —77— in which is loosely mounted a lens rest —78—. This lens rest preferably consists of a cylindrical pin or post co-axial with the drill spindle and drill and provided with a conical upper end and an enlarged lower end forming a head —79— having a rounding lower bearing face —80— which is concentric with the produced axis of the supporting spindle —21— for the bracket —20— and is adapted to bear against the upper face of the lens centering block —40—. The upper face of the block —40— therefore forms a support for the lens rest —78— to hold it in operative position in axial alinement with the drill spindle and at the same time permits the block —40— and its supporting bracket —20— to be tilted vertically to different angles without disturbing the position of the lens rest or post —78— which always remains in axial alinement with the drill spindle, the object being to afford a firm bearing for the portion of the lens which is to be drilled during the drilling operation.

The upper lens bearing face of the lens rest —78— is disposed approximately at the intersection of the produced axes of the spindle —21— and drill spindle —11— but is a trifle below the horizontal plane of the spindle —21— so as to support the portion of the lens to be drilled in a horizontal plane or at right angles to the axis of the drill spindle, thereby permitting the lens to be drilled part way through from opposite sides with the assurance that the opposite drill holes will be in exact alinement.

The stop pin —67— is disposed in the same vertical plane as the axis of the drill spindle but at right angles thereto and is adjustable toward and from said axis to gage the distance at which the lens is to be drilled from the edge thereof.

The stop pin —67— is preferably mounted in an externally threaded sleeve —67'— which is screwed in a threaded opening —80— in the arm —75— and is provided with an operating member —81— by which the sleeve and pin may be adjusted toward and from the produced axis of the drill spindle, the periphery of the operating member —81— being graduated to register with a suitable index on an adjacent projection —82— of the arm —75—. The inner end of the stop pin —67— is preferably flattened and arranged edgewise vertically and is held in this position by means of an angular locking key —83— having one end inserted in the projection —82— and its other end passed through an aperture in the outer end of the stop pin as shown more clearly in Fig. 4. The projection —82— preferably consists of a screw engaged with a threaded aperture in the arm —75— to afford means for slightly adjusting the stop pin when necessary to harmonize the reading of the graduations on the operating member —81— with the corresponding distance of the stop pin from the produced axis of the drill spindle.

*Drill controlling means.*—Suitable means is provided for moving the drill spindle and drill axially so as to drill the lens part way through under yielding pressure, and for this purpose we have provided a lever —90— which is pivoted at its rear end at —91— to one side of the upper portion of the standard —1— and is provided at its opposite or front end with a suitable handle —92— by which it may be depressed or raised if desired. The drill spindle and its supporting frame including the guide rod —16— are held in their normal raised positions with the drill away from the lens rest —78— by means of a coil spring —93— encircling said guide rod —16— between the arm —3— and a suitable pin or shoulder —94— on the rod —16—. A rock arm —96— is fulcrumed on the same pivot —91— co-axial with the lever —90— in close proximity thereto and is provided with a forked end engaged with the pin —94— to reciprocate the drill spindle and its supporting frame as the lever —90— is operated in drilling a lens. The lever —90— is yieldingly connected to the rock arm —96— through the medium of a spring —97— and bell crank lever —98—, the latter being pivoted at —99— to upstanding ears —100— on the rock arm and is provided with a rearwardly projecting apertured heel —101— for receiving an adjusting screw —102— by which the lever —98— may be adjusted to vary the tension of the spring —97—. The object of these connections between the operating lever —90— and drill spindle is to enable the drill to be brought into drilling engagement with the lens under a yielding and more uniform pressure and without liability of breaking the lens.

The normal tension of the spring —97— is just sufficient to carry the drill frame down to its drilling position against the action of the retracting spring —93— when the lever —90— is depressed for drilling a lens so that if the drill is brought into drilling engagement with the lens, the lever may be further depressed against the action of the spring —97— without liability of causing excessive pressure or rapidity of feed of the drill into the lens, under which conditions the tensioned spring will produce a gradual but relatively light progressive feeding of the drill into the lens irrespective of the pressure which may be brought to bear upon the operating lever, thereby reducing the liability of cracking the lens by excessive pressure of the drill therein. As soon as the pressure upon the lever is relieved, however, the spring —93— automatically returns said lever and parts operated thereby to their normal up position.

*Adjustable depth gage.*—In order that lenses of varying standard thicknesses may be drilled to certain predetermined depths from one side, we provide an adjustable depth-gage forming the subject matter of a divisional application No. 750,428, filed February 24, 1913, having different portions or points thereof of varying thicknesses corresponding to the various standard thicknesses of lenses adapted to be brought into registration with a suitable stop for limiting the movement of the drill supporting frame and thereby limiting the degree of movement of the drill into the lens in the initial operation of drilling from one side.

The preferred form of gage shown in Figs. 1, 2, 3 and 9 consists of a hardened metal disk —105— encircling the upper portion of the guide rod —16— concentric therewith and resting loosely upon the upper face of the upper arm —4— of the standard —1—, said disk being provided with a plurality of, in this instance six, steps or abutments —106— arranged circumferentially around the axis of the disk in different horizontal planes, each step being gaged to correspond to a lens of predetermined standard thickness and is adapted to be shifted by rotation of the disk into vertical alinement with a coöperative stop —108— on the yoke —15— of the drill supporting frame, said stop being preferably made in the form of a screw engaged in a threaded aperture in said yoke and projecting some distance below the same for contact with the step which may be alined therewith as the drill supporting frame is depressed in the operation of drilling and is held in its adjusted position by a set screw —109—.

The gage disk is provided in its underside with a series of apertures or sockets —110— one for each step for receiving a locking pin —111— projecting upwardly from the upper face of the arm —4— to lock the disk in its adjusted position, said disk being held in locking engagement with the pin —111— by means of a coil spring —112— which encircles the upper portion of the guide rod —16— between the upper face of the disk and lower face of the yoke —15—. In adjusting the disk, it is simply necessary to elevate the same by hand against the action of the spring —112— until disengaged from its locking pin —111—, whereupon it may be rotated to bring any one of the other steps into alinement with the stop pin —108—.

In Figs. 12 and 13 we have shown a modified form of gage disk —105'— as journaled upon a circular bearing —113— on a yoke —15'— and provided with an eccentric bearing face —116— for coöperative contact at any point with the upper end of a stop pin —108'— which latter is, in this instance, screwed in a threaded aperture in the arm —4— and held in its adjusted position by a set screw —109'—. The side of the disk —105'— opposite the cam face —116— is provided with a series of radial slots —117— of different widths circumferentially corresponding to different standard thicknesses of lenses which they are adapted to receive, said slots constituting trial gages for determining the thickness of any lens which it may be desired to drill. That is, the lens to be drilled is taken in hand and placed edgewise in the notch or slot corresponding most nearly to its thickness and then with the lens still in the slot and as a handle the disk is rotated about its axis until the lens comes in contact with a stop —118—, by which operation the portion of the cam face —116— corresponding to the depth to which such lens should be drilled is brought into vertical alinement with the upper end of the stop pin —108'— so that when the drill frame is depressed to bring the drill into contact with the lens, the depth of the drill hole will be limited by the engagement of the edge of the disk —116— with the stop pin —108'—. The slots —117— progressively increase in width circumferentially in one direction from one end to the other end of the series, while the opposite cam face —116— gradually increases in radius in the same direction so that when a lens is placed in the narrowest slot and brought against the stop —118— as indicated in Fig. 13, the point in the cam face of least radius is brought into vertical alinement with the stop pin, thereby allowing the drill frame to move through a greater distance before the drill contacts with the lens than would be the case when either of the other slots is brought into the same relation to the stop —118— by the positioning of the lens therein and turning of the disk, the stop pin —108'— and cam face being relatively adjusted so as to allow the drill to enter only part way through the lens in the initial operation of drilling from one side after which the lens is inverted and the drilling operation finished from the opposite side in the manner previously described.

In Fig. 20 is shown a modified depth gage in which a screw —108''— may be substituted for the screw —108— and provided with an annular disk or collar —105''— having a circular series of indexes or graduations coacting with the fixed index on the yoke —15''— whereby the rotary adjustment of the screw in one direction or the other will vary the distance between its lower contact end and upper face of the arm —4— with which it is adapted to coact to limit the drilling movement of the drill into the lens to correspond to the index or graduation on the disk or collar. This disk or collar is preferably threaded internally for receiving the screw —108''— and permitting it to be adjusted thereon to cause the registration of any one of the graduations corresponding to a lens of certain prescribed thickness to register with the fixed index when the screw-stop is properly adjusted to limit the drilling of such lens to the desired degree, the disk being held in operative position by a set-screw —109''—.

What we claim is:

1. In a lens drilling machine, a reciprocatory frame, a retracting spring therefor, a drill spindle mounted on the frame to move therewith, a lever, and means actuated by said lever for moving said frame against the action of the retracting spring including a spring of greater power than said retracting spring.

2. In a lens drilling machine, an axially movable drill spindle, retracting means therefor, and additional means for moving the drill spindle against the action of its retracting means including a spring of greater power than said retracting means.

3. In a lens drilling machine, a main frame, a drill spindle movable axially thereon, a rock arm pivoted to the frame, an operating lever, means including a spring for transmitting motion from the lever to the rock arm, and additional means for transmitting motion from the rock arm to the drill spindle.

4. In a lens drilling machine, a main frame, a drill spindle movable axially thereon, a rock arm pivoted to the frame, an operating lever, means including a spring for transmitting motion from the lever to the rock arm, additional means for transmitting motion from the rock arm to the drill spindle, and means for limiting the movement of the rock arm in the operation of drilling irrespective of the lever.

5. In a lens drilling machine, means for moving a drill axially toward and from the work comprising, in combination, relatively movable rocking members having means for limiting their relative movement in one direction, a spring connecting said members, one of said members being an operating lever, and means for transmitting motion from the other member to the drill.

6. A lens drilling machine having an axially movable drill spindle, means for moving the spindle axially to feed the drill into the work, said means including a lever movable independently of the drill spindle, a spring connected to said lever, and connections between said spring and spindle for transmitting movement to said spindle as the spring is operated by the lever.

7. A lens drilling machine having an axially movable drill spindle, independently movable levers one of which is operated by hand independently of the spindle, connections between the other lever and spindle for moving the latter axially to its drilling position, and a spring connecting said levers.

8. A lens drilling machine having an axially movable drill spindle, independently movable levers one of which is operated by hand independently of the spindle, connections between the other lever and spindle for moving the latter axially to its drilling position, a spring connecting said levers, and means for adjusting one of the levers relatively to the other to vary the tension of the spring.

9. A lens drilling machine having an axially movable drill spindle, a lever operable at will independently of the spindle, a rock arm separate from but contacting with the lever, connections between the rock arm and spindle, an additional lever pivoted to the rock arm and adjustably locked thereto, and a coil spring connecting the levers and normally holding the rock arm in contact with the first named lever.

10. A lens-drilling machine having an axially movable drill spindle, means including a spring for feeding the drill spindle into the work and manually operated means for tensioning the spring, and additional means for stopping the feeding movement of the drill spindle by the spring when the drill has entered only part way through the lens.

11. A lens-drilling machine comprising an axially movable drill spindle, relatively movable levers, and a connecting spring between them for moving the drill spindle to its drilling position, one of the levers being operated by hand, and a retracting spring for returning the drill spindle and levers to their normal positions.

In witness whereof we have hereunto set our hands on this first day of August 1912.

GUSTAV A. BADER.
CHAUNCEY W. HOWLAND.

Witnesses:
WILLIAM J. ESPEY,
M. GOETCHIUS.